United States Patent
Pine et al.

(10) Patent No.: US 11,067,828 B2
(45) Date of Patent: Jul. 20, 2021

(54) EYEWEAR LENS OR OPTICAL FILM WITH DECORATIVE DICHROMIC MIRROR PATTERN HAVING VARIABLE OPACITY

(71) Applicants: Jerrold Scott Pine, Boca Raton, FL (US); Brandon T Michaels, Palm Beach Gardens, FL (US)

(72) Inventors: Jerrold Scott Pine, Boca Raton, FL (US); Brandon T Michaels, Palm Beach Gardens, FL (US)

(73) Assignee: Brandon T. Michaels, Palm Beach Gardens, FL (US)

( * ) Notice: Subject to any disclaimer, the term of this patent is extended or adjusted under 35 U.S.C. 154(b) by 0 days.

(21) Appl. No.: 17/073,365

(22) Filed: Oct. 18, 2020

(65) Prior Publication Data
US 2021/0173228 A1      Jun. 10, 2021

Related U.S. Application Data

(60) Provisional application No. 62/945,171, filed on Dec. 8, 2019.

(51) Int. Cl.
| G02C 7/02 | (2006.01) |
| G02B 5/23 | (2006.01) |
| G02B 5/28 | (2006.01) |

(52) U.S. Cl.
CPC ............ G02C 7/021 (2013.01); G02B 5/23 (2013.01); G02B 5/28 (2013.01); G02C 2202/16 (2013.01)

(58) Field of Classification Search
CPC .......... G02C 7/021; G02C 7/10; G02C 7/102; G02C 7/104; G02C 7/105; G02C 7/107; G02C 7/108; G02C 2202/16; G02B 5/23; G02B 5/26; G02B 5/28; G02B 5/283

USPC ............................ 351/159.61–159.66, 159.69
See application file for complete search history.

(56) References Cited

U.S. PATENT DOCUMENTS

| 4,160,655 | A  | * | 7/1979  | Kingsbury, Jr. | .......... C03C 4/06 501/13 |
| 6,313,466 | B1 | * | 11/2001 | Olsen | .................. H01L 21/3144 250/372 |
| 9,651,801 | B2 |   | 5/2017  | Okubo et al. | |

(Continued)

FOREIGN PATENT DOCUMENTS

ES      1243939      *   3/2020

OTHER PUBLICATIONS

Ortiz-Vazque et al., Release of butylated hydroxytoluene (BHT) from Poly(lactic acid) films, Polymer Testing, vol. 30, Issue 5, 2011, pp. 463-471 (Year: 2011).*

(Continued)

*Primary Examiner* — Travis S Fissel
(74) *Attorney, Agent, or Firm* — Jerrold Scott Pine; Fleit Intellectual Property Law

(57) ABSTRACT

The present invention relates to dichromic mirrored patterns on fashion eyewear that exhibits variable opacity on the exterior of a photochromic lens in response to changing lighting conditions wherein the pattern can go from virtually transparent to opaque. The dichromic mirror pattern(s) can be coated in multi-color pattern sections and can be coated so that some pattern sections have variable opacity and other pattern sections have a fixed high opacity. The effect can also be produced on an optical film to be applied to many optical surfaces.

18 Claims, 4 Drawing Sheets

(56) References Cited

U.S. PATENT DOCUMENTS

| | | | | |
|---|---|---|---|---|
| 2003/0035917 A1* | 2/2003 | Hyman | ............... | B41M 5/36 |
| | | | | 428/67 |
| 2008/0151182 A1* | 6/2008 | Hsu | ............. | B29D 11/00432 |
| | | | | 351/159.27 |
| 2009/0122261 A1* | 5/2009 | Chou | ............... | G02B 5/3025 |
| | | | | 351/159.62 |
| 2014/0016083 A1* | 1/2014 | Macionczyk | ......... | B23K 26/40 |
| | | | | 351/159.6 |
| 2019/0171034 A1* | 6/2019 | Maurice | ............ | G02C 7/021 |
| 2019/0235279 A1* | 8/2019 | Hones | ............... | G02C 7/027 |
| 2019/0310492 A1* | 10/2019 | Gromotka | ....... | B29D 11/00009 |

OTHER PUBLICATIONS

Science and Technical Information Center (STIC) search (Year: 2021).*

Author: E. Andreichenko Written Opinion of the International Searching Authority International application No. PCT/US 2020/063608 dated Mar. 25, 2021.

* cited by examiner

EYEWEAR LENS OR OPTICAL FILM WITH DECORATIVE DICHROMIC MIRROR PATTERN HAVING VARIABLE OPACITY

This application claims the benefit of U.S. Provisional Application No. 62/945,171, filed Dec. 8, 2019.

TECHNICAL FIELD

The present invention relates to an eyewear lens, more particularly, the present invention relates to mirrored patterns on fashion eyewear that exhibits variable opacity from the exterior surface of a photochromic lens in response to changing lighting conditions wherein the pattern can go from virtually transparent to opaque.

BACKGROUND OF THE INVENTION

The eyewear industry consistently evolves lenses with a host of coatings to create unique utility for high fashion eyewear. Some coatings such as anti-reflection, hard coats, water repellants, and photochromic coatings increase the durability of the lens, eliminate glare, and reduce eye strain from changing ambient lighting. Other coatings such as dichromic mirror coatings are generally used for aesthetics. Dichromic mirror coatings are alternating layers of optical coatings with different refractive indices that are built up upon a lens surface which selectively pass light of a small range of colors while reflecting other colors. They come in various reflection colors such as blue, red, orange, violet, green, pink, yellow, gray, black, brown, white, silver, and gold. One interesting use of dichromic mirrored coatings involves masking portions of the lens prior to the introduction of the dichromic mirror coating to create mirrored patterns and logos on the lens. One such implementation is "OPTICAL LENS", U.S. Pat. No. 9,651,801 B2 assigned to Hoya Corporation, of Tokyo, Japan. Hoya's technology creates mirrored coating patterns on lenses with vibrant patterns on the exterior of the lens and patterns that are transparent when viewed through the interior of the lens. The mirrored patterns reflect from the top surface of the lens with high fixed opacity.

Photochromic lenses are optical lenses that become darker or lighter based on the amount of exposure to ultraviolet radiation. In the presence of ultraviolet light the lenses become darker and in the absence of ultraviolet light the lenses return to their clear state. Photochromic lenses may be made of polycarbonate, glass, or acrylic. They are principally used in eyewear that darken in bright sunlight, but become clear in low ambient light to reduce eye strain. They darken significantly within sixty seconds of exposure bright sunlight, but can take longer to clear when subsequently exposed to low ultraviolet light. Indoor lighting generally has little ultraviolet light so indoors the lenses generally stay clear. They are intended to be used as a single pair of glasses for indoor and outdoor use that provide comfortable viewing in both environments. Different ranges of clear and dark transmittances can be created. For simplicity of this invention all the specific coating layers and construction that make up stock photochromic lenses are considered well known in the art but may also be comprised of various constructions that may contain proprietary elements from different manufacturers.

It can be appreciated that the arrangement of coatings on an eyewear lens fabricated from polycarbonate or acrylic can also be applied to a laminate film made form the same materials or similar plastics. That laminate could be applied to other optical lenses or virtually any other surface to generate similar optical effects.

Absent specific anti-reflection coating layers to maximize opacity of mirrored coatings, they will appear near transparent when applied to a stock untinted lens. As the tint level increases so does the apparent opacity of the dichromic mirrored coating. The variable tint levels of photochromic lenses can therefore affect the opacity of a mirrored patterned surface. This effect forms the basis for this unique combination of coatings that provide an eyewear lens with decorative pattern having variable opacity.

SUMMARY OF THE INVENTION

What is needed is to create a patterned dichromic mirror coating on an optical lens that has variable opacity.

What is further needed is to have multiple dichromic mirror coatings to create a multi-colored pattern that has variable opacity.

What is further needed is to provide both dichromic mirror patterns with fixed opacity and mirror patterns with variable opacity on the same lens.

What is further needed is to create a patterned dichromic mirror coating on an optical film that has variable opacity.

What is further needed is to laminate the patterned dichromic mirror coating on an optical film to an optical lens.

What is further needed is to laminate the patterned dichromic mirror coating on an optical film to an optical surface.

What is further needed is to have the patterned mirror coating have variable opacity when viewed from the exterior of the lens but always appears transparent when viewed from the interior of the lens.

What is further needed is to use a pair of photochromic lens containing a coated pattern of dichromic mirror that are cut and fitted into a frame to create fashion eyewear.

BRIEF DESCRIPTION OF THE DRAWINGS

The present invention will become more fully understood from the detailed description given hereinbelow and the accompanying drawings which are given by way of illustration only, and thus are not limitive of the present invention, and wherein.

DETAILED DESCRIPTION OF THE PREFERRED EMBODIMENTS

Figure 1:
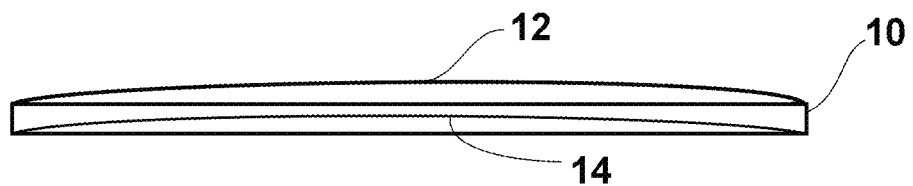
FIG. 1 is a side view of a stock photochromic lens, while it is in use, and well known in the art
Figure 2:
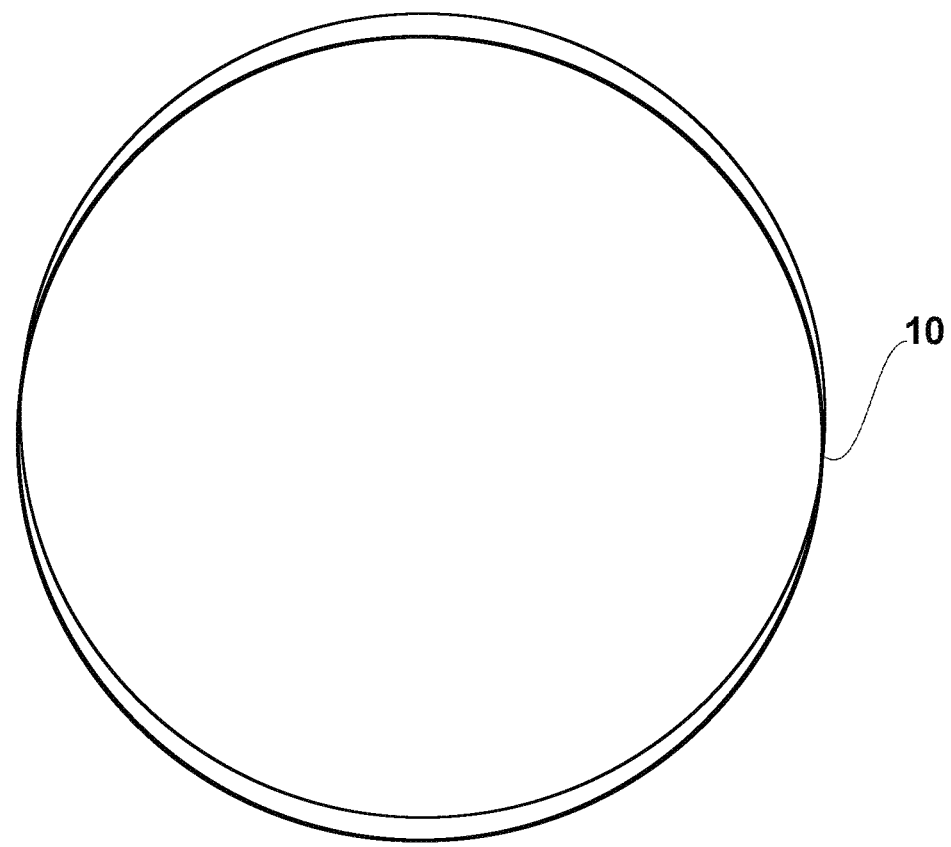
FIG. 2 is a top view of a stock photochromic lens, while it is in use, and well known in the art
Figure 3A:
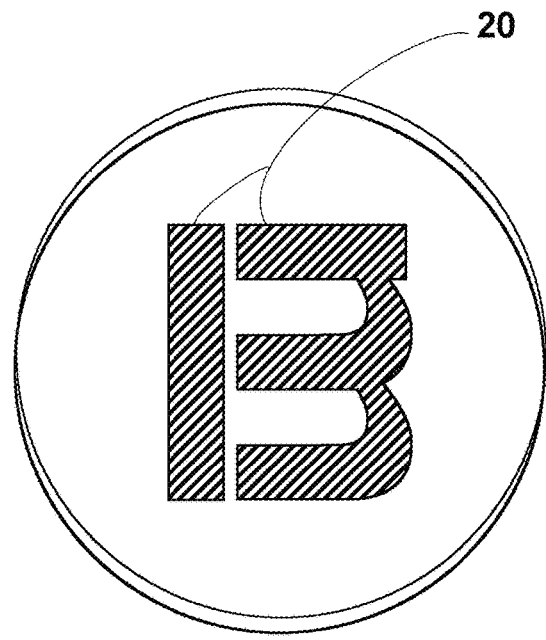
FIGS. 3A, 3B, 3C and 3d are Top views of an embodiment illustrating variable opacity of mirrored patterns, while it is in use, according to the invention.
Figure 3B:
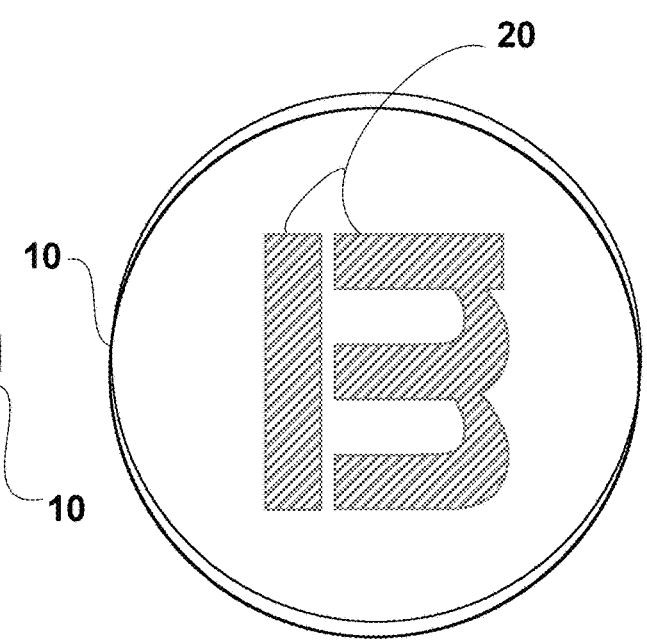
Figure 3C:
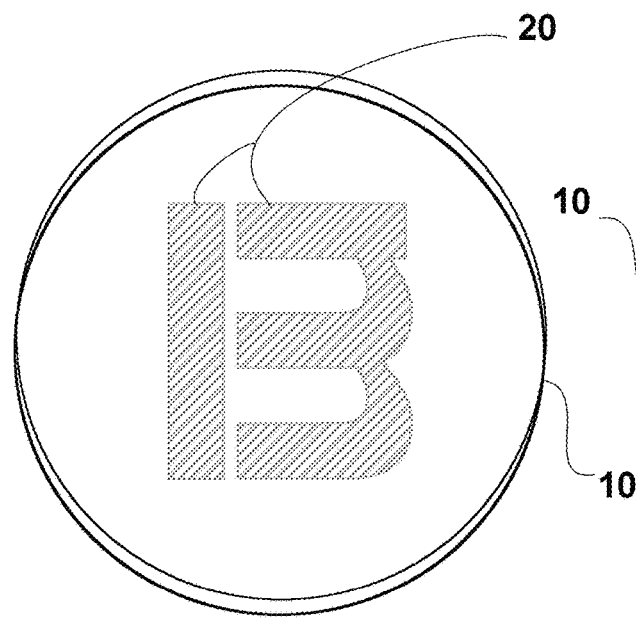
Figure 3D:
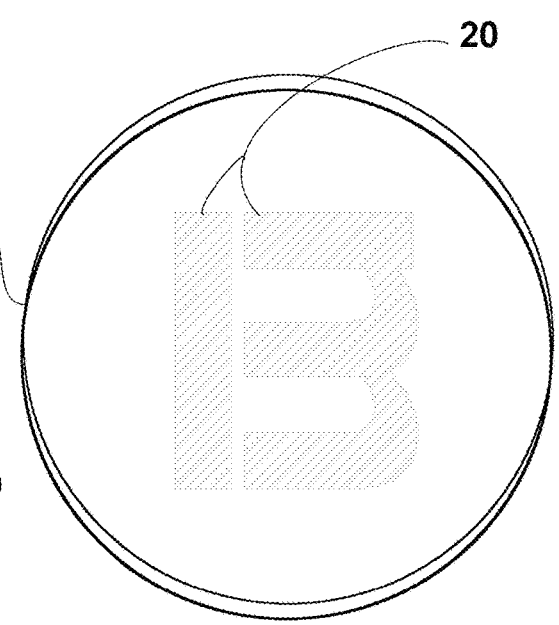
Figure 4A:
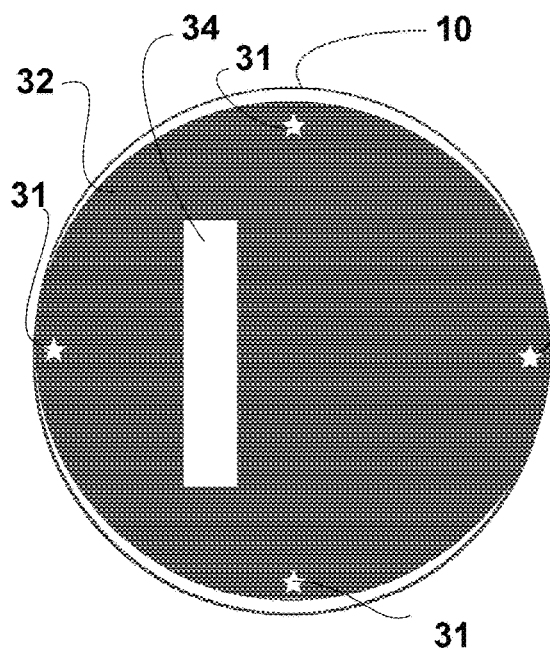
FIGS. 4A, 4B, 4C, and 4D are Top views of a masking apparatus to form mirrored patterns, while it is in use, according to the invention.
Figure 4B:
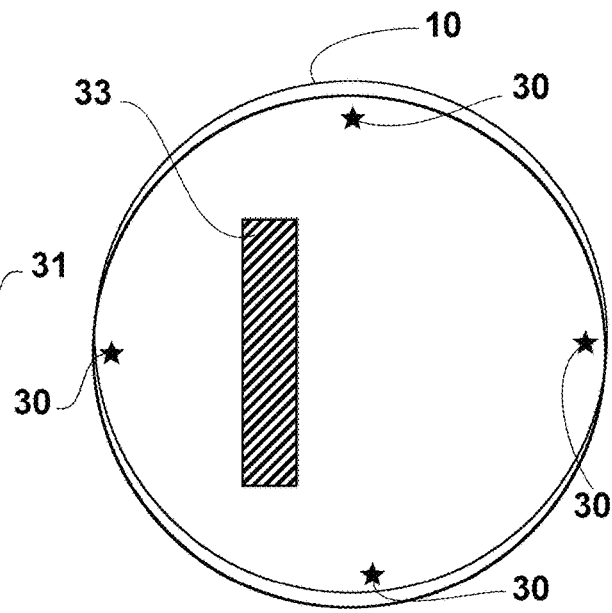
Figure 4C:
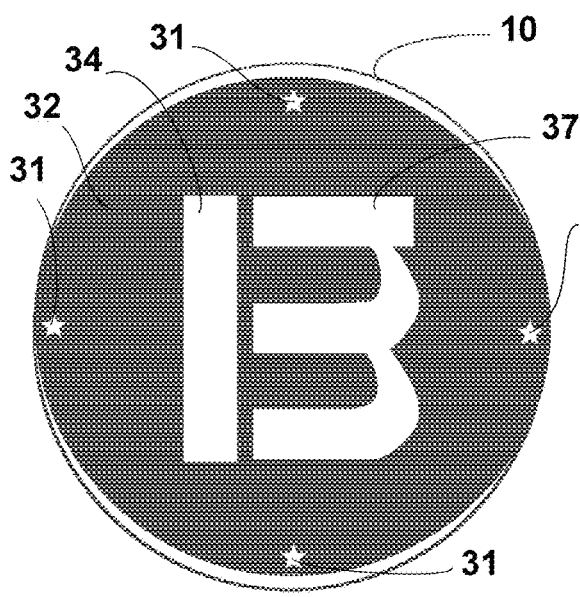
Figure 4D:
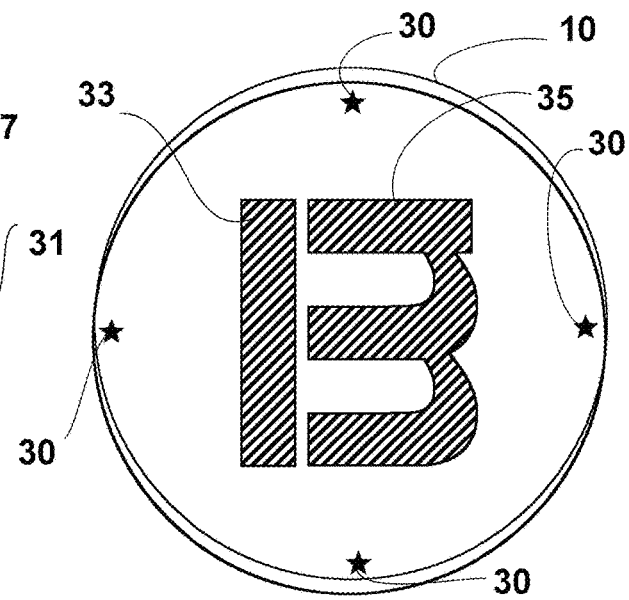

Referring to FIG. 1 and FIG. 2 there is a photochromic eyewear lens 10.

Figure 6:
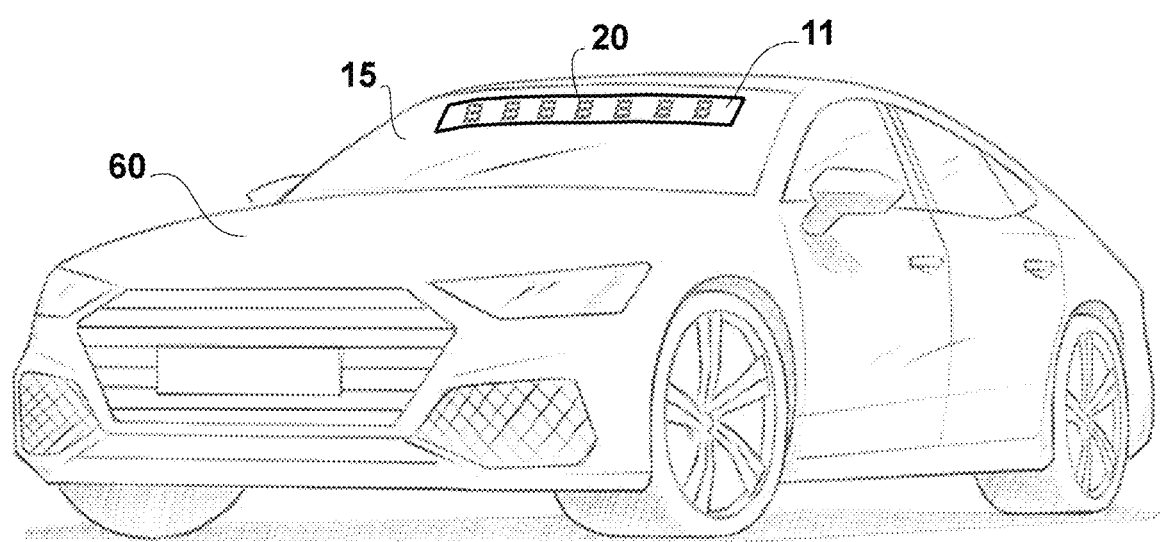
FIG. 6 is a front view of an automobile with an optical film containing mirrored patterns attached to its windshield, while it is in use, according to the invention.

The photochromic eyewear lens 10 is a typical stock eyewear lens that is not yet customized for shape or image patterns containing a photochromic color coating that is not modified to enable this invention and that has a size, thickness, and round shape appropriate to be cut to fit into the perimeter or shape appropriate for a frame of any style eyewear. The photochromic eyewear lens 10 can be made of various materials such as polycarbonate, acrylic, cr39, Trivex, Tribrid, high index plastic, glass, or any other suitable substrate. The photochromic eyewear lens 10 can have transition colors such as blue, violet, green, gray, pink, red, amber, yellow, orange and brown. It can be appreciated that the arrangement of coatings to create a photochromic eyewear lens 10 fabricated from polycarbonate or acrylic can also be applied to an optical film 11 made from the same materials or similar plastics. That optical film 11 could be applied to an eyewear lens or virtually any other optical surface 15 to generate similar optical effects from its various coatings. For example, an optical film 11 may be laminated or adhered with optical adhesive to an optical surface 15 surface such as a window or an automobile 60 windshield as illustrated in FIG. 6. A stock photochromic eyewear lens 10 is generally formed with a convex exterior surface 12 and a concave interior surface 14. When used for non-prescription glasses the optical magnification between the convex exterior surface 12 and a concave interior surface 14 is 1×. Stock photochromic eyewear lens 10 may also be ordered for prescription correction of many eye conditions such as near sightedness, far sightedness, and astigmatism. Prescription lenses may have the lens surface preformed or ground into the convex exterior surface 12 or concave interior surface 14 or both. The techniques for forming prescription lens surfaces are well known in the art and have many different processes to achieve the same result. If the prescription is ground into a stock photochromic eyewear lens 10 then a hard coating and/or an anti-reflection coating may need to be added to the ground surface as preparation for adding a mirror coating. These coating steps may be needed based on which surface(s) is ground and what coatings may have been removed in the process.

Referring to FIGS. 3A, 3B, 3C and 3D there are dichromic mirror pattern(s) 20 on convex exterior surface 12 of photochromic eyewear lens 10 illustrating various opacity levels for dichromic mirror patterns 20. On FIG. 3A the dichromic mirror pattern(s) 20 is highly opaque with the photochromic eyewear lens 10 at maximum darkness because it is exposed to intense UV Light. Please note that the darkness of photochromic eyewear lens 10 is not illustrated in FIGS. 3A-3D to better illustrate the opacity of the dichromic mirror pattern(s) 20. On FIG. 3B the dichromic mirror pattern(s) 20 is mostly opaque with the photochromic eyewear lens 10 at moderate darkness because it is exposed to moderate UV Light. On FIG. 3C the dichromic mirror pattern(s) 20 is mildly opaque with the photochromic eyewear lens 10 at minimum darkness because it is exposed to mild UV Light. On FIG. 3D the dichromic mirror pattern(s) 20 is highly transparent with the photochromic eyewear lens 10 clear because it is exposed to no or minimal UV Light. Alternatively, dichromic mirror pattern(s) 20 can be formed on an optical film 11 that has a photochromic coating and will exhibit the same variable opacity in response to UV light.

Referring to FIGS. 4A, 4B, 4C and 4D there photochromic eyewear lenses 10 having mask 32 with negative masking pattern 34, negative masking pattern 37, and negative masking fiducial pattern 31 that are used to mask off the areas on photochromic eyewear lenses 10 where dichromic mirror pattern 33, dichromic mirror pattern 35 and dichromic mirror fiducial pattern 30 are coated on to the surface of photochromic eyewear lenses 10 in a process described in the next section. The mask 32 with negative masking pattern 34 and negative masking pattern 37 can be processed together with a dichromic mirror coating to yield dichromic mirror pattern(s) 20 shown in FIGS. 3A-D once mask 32 is removed. Alternatively a mask 32 on photochromic eyewear lenses 10 may only have negative masking pattern 34 and negative masking fiducial pattern 31 that when coated with a dichromic mirror produces only half of dichromic mirror pattern(s) 20 comprising dichromic mirror pattern 33 and dichromic mirror fiducial pattern 30. After removing mask 32, the resulting photochromic eyewear lenses 10 would have a dichromic mirror pattern 33 with a given reflective color or with additional coatings could have full opaqueness independent of the photochromic colored lens. By repeating the process with mask 32 on the same photochromic eyewear lenses 10 that only has negative masking pattern 37 and negative masking fiducial pattern 31 that when coated with a dichromic mirror produces only half of dichromic mirror pattern(s) 20 comprising dichromic mirror pattern 35 which creates a dichromic mirror pattern(s) 20 with each masked portions of mirrors reflecting different colors that creates multi-colored mirrored patterns. Dichromic mirror fiducial patterns 30 that are coated on to photochromic eyewear lenses 10 are used to align subsequent masking steps for additional colors. It can be appreciated that the masking operation can be preformed over and over to produce portions of patterns in as many colors or variations of opacity as desired.

Figure 5:
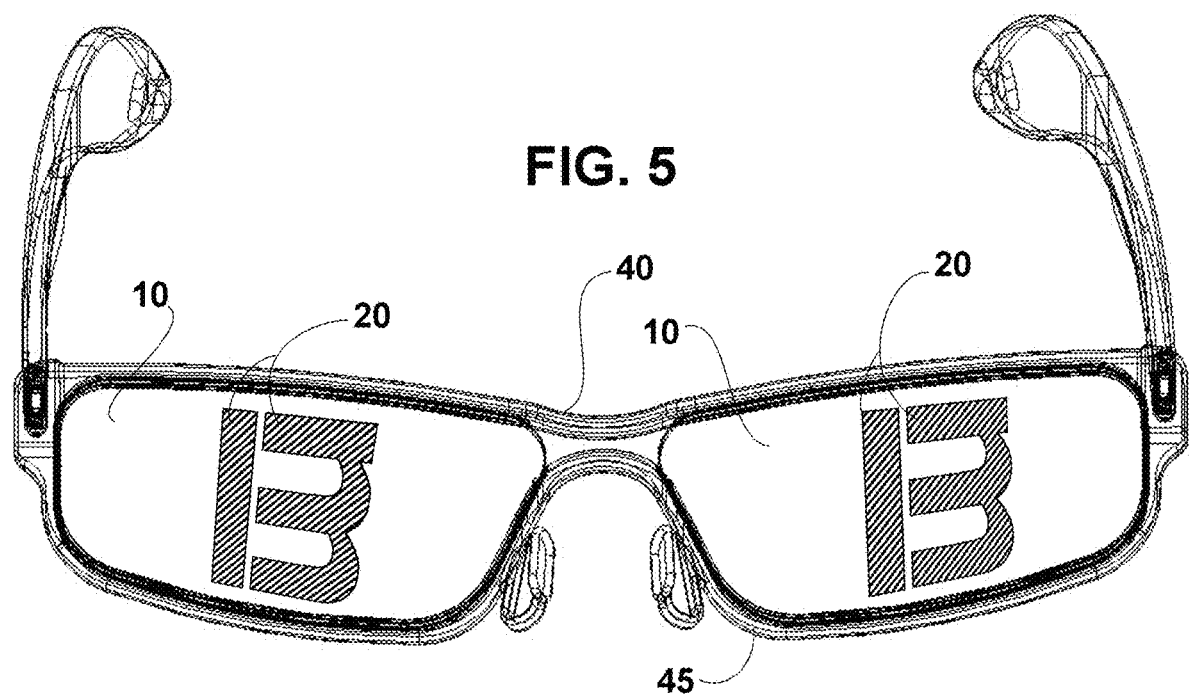
FIG. 5 is a front view of eyewear containing mirrored patterns, while it is in use, according to the invention.

Referring to FIG. 5, there is eyewear 40 that is comprised of Photochromic eyewear lenses 10 with dichromic mirror pattern(s) 20 that are mounted in frames 45. This invention contains qualitative effects which can not be defined in quantitative terms across the scope of the invention and therefore the following process will illustrate how to produce a patterned dichromic mirror coating on a photochromic eyewear lens that has variable opacity to external observers looking at the lens and is virtually transparent to a user wearing the lens. The process according to the invention to produce eyewear 40 begins with selection of the blank photochromic lenses 10. The photochromic eyewear lenses 10 can either be a finished factory hard coated photochromic with various photochromic colors, clear/tinted lenses, with/without prescription or a semi-finished lens blank that requires to be processed through an optical laboratory.

When starting with a semi-finished blank the representative process includes:

Computing required the proper lens blank for the prescription;

Placing a surface protectant tape over the front face of the lenses;

Apply blocking which creates adhesion to the lenses to step one block using a lens safe wax which allows a lens to be chucked onto the surfacing machinery;

SL2 Generator, Generating the lenses are the process that grinds the curvature into the backside of the lens where during this process each lens is finished with fine to deep generator marks depending on the material of the lens;

A—Fining is the process that smoothes out the generator marks using high grit sanding pads specifically designed for fining where the process requires tools otherwise known as laps that match the curvature of the generated lens and the fining pad adheres to the top of the lap and is ran through a wet sanding process until the marks have been smoothed out;

B—Polishing of the lenses are the process where the lens is then buffed out using specific buffing pads for the same laps and an aluminum oxide liquid polish for roughly 3-5 minutes until each lens is transparent and flawless;

De-blocking the lenses from the first step block and removing the surface tape;

The lenses are washed and prepped to be sent to the backside coating machine where each lens is sent through a three-step coating machine which pressure cleans the lenses to ensure no dust is present on the surface, then spun through the hard coat which is then cured by ultraviolet light.

At this stage both semi-finished lens blanks are equivalent to a factory hard coated photochromic with various photochromic colors, clear/tinted lenses, with/without prescription(photochromic eye wear lenses 10), where the process continues after the lenses are brought to a clean room to remain dust free for the next process.

Prior to applying the dichromic mirror coating each photochromic eyewear lenses 10 goes through a thorough cleaning step.

The cleaning step consists of multiple stages:

A quick soak of all photochromic eyewear lenses 10 in a 99.9% isopropyl medical grade to remove all impurities and factory marking that may be applied on each photochromic eyewear lenses 10 from manufacture then wiped with a lint free clean room tissue to dry each lens;

Now the photochromic eyewear lenses 10 are put onto a holder to go into the ultrasonic machine a Satis Loh T 5 ultrasonic where this machine has four compartments which now cleans the photochromic eyewear lenses 10 and preps photochromic eyewear lenses 10 for next process where the first compartment is a soap NGL technology optical 17.40 sp used in powder form 9.3 ph.(3% DI) Conc: 5-20 g/L tc 30-70 c/86-158 F for 2-5 Min 1% (40 g), the next compartment contains a filtered distilled rinse that now removes soap off the lenses, the next compartment contains is the DI (deionized) water where it again rinses anything left behind while still in the ultrasonic process, and the final compartment is also DI water that now slowly empties to make a spot free drying compartment with light heat to dry each photochromic lens 10;

Then the photochromic eyewear lenses 10 are placed in an oven for 90 to 120 minutes at 110 degrees F. for degassing.

The next process at this stage is a lens masking application that will be used to create the mirror pattern on each photochromic lens 10. There are a variety of masking techniques that are equivalent for this function. The mask can be ink-jet printed, as cited in Hoya's Patent. There are photo masking techniques where a coating sensitive to light is placed on each lens and exposed to light through a pattern aperture where they cure into a mask. The mask is placed or formed on the convex exterior surface of each photochromic lenses 10. Once the mask is applied, the photochromic eyewear lenses 10 are prepped to be processed in an MC280x Satis Loh Anti Reflective coating machine where the steps are as follows:

Each photochromic eyewear lens 10 is placed on a ring holder that goes on to the machine dome where the photochromic eyewear lenses 10 reside with convex side having the mask facing inward for the mirroring coating process;

The dome is placed into the machine which uses a vacuum pump to evacuate the coating chamber to a starting pressure of 5.00E-3 psi;

Once at the proper pressure, the machine starts a clean cycle which etches the photochromic eyewear lenses 10 to help absorb the burning minerals in the next process where the clean cycle is a tungsten filament-based ion source Mark 1 Plus which distributes argon and oxygen to facilitate the etching process;

The process now consists of two burning minerals, silicon dioxide (SIO2) and zirconium dioxide (ZRO2);

The first layer, SIO2, gets applied by the electronic beam (EB Gun) and has a deposition thickness of 48.86 nanometers (NM);

The second layer, ZRO2, gets evaporated and applies a deposition of 49.83 NM on top of the first layer;

A new cleaning cycle is initiated and the process of S102 and ZRO2 repeats one more time;

After these deposition processes are complete, the dichromic mirror layer coating of each photochromic eyewear lens 10 is done, the machine comes out of vacuum, the dome is removed, the photochromic eyewear lenses 10 get taken out of dome and the mask is removed from the photochromic eyewear lenses 10 to reveal the mirror pattern.

The photochromic eyewear lenses 10 with dichromic mirror pattern(s) 20 are sent to the bench department where they will be edged and mounted into a frame 45. The Edging starts with tracing the frame or rimless lens pattern which can be customized by shape and size. Once the frame pattern is traced, each lens will then be blocked on the finish blocker using standard hydrophobic safe blocking pads. Each lens image is centered to the shape of the frame 45. Once blocked a lens is chucked onto the edging machine and cut into shape. After any necessary size or drill coordinate adjustments are made to each photochromic lens 10, the photochromic eyewear lenses 10 are made safe to be put in the frame 45 by smoothing sharp edges on a stone wheel. The photochromic eyewear lenses 10 with dichromic mirror pattern(s) 20 are then mounted into the frame 45 as eyewear 40. Photochromic eyewear lenses 10 with dichromic mirror pattern(s) 20 and frame 45 are cleaned with a dry microfiber lens cloth to remove fingerprints and dust and are complete.

It can be appreciated that the above process is representative of different processes, using different equipment and different process steps that can be alternatively used to create the same outcome.

It will thus be seen that the needs set forth above, and those made apparent from the preceding descriptions, are effectively attained and since certain changes may be made in the above construction without departing from the spirit and scope of the invention, it is intended that all matter contained in the above description or shown in the accompanying drawings, shall be interpreted as illustrative and not in a limiting sense.

It is also to be understood that the following claims are intended to cover all generic and specific features of the invention herein described and all statements of scope of the invention, which as a matter of language, might be said to fall there between.

What is claimed is:

1. A patterned dichromic mirror coating on a photochromic eyewear lens that has variable opacity comprising:
    a stock photochromic eyewear lens without modification to the photochromic layer;
    said photochromic eyewear lens containing a coated pattern of dichromic mirror layer forming an image on the outer lens surface;
    said image viewable only to an external viewer;
    said image having variable opacity that ranges from transparent to opaque in response to ambient UV light.

2. The photochromic eyewear lens according to claim 1 wherein said lens is constructed of at least one optical material that is polycarbonate, acrylic, cr39, Trivex, Tribrid, high index plastic or glass.

3. The photochromic eyewear lens according to claim 1 wherein said lens has a transition color that is blue, violet, green, gray, pink, red, amber, yellow, orange or brown.

4. The photochromic eyewear lens according to claim 1 wherein said lens can have a non-prescription magnification of 1x or have any prescription correction for many eye conditions such as near sightedness, far sightedness, and astigmatism.

5. The coated pattern of dichromic mirror according to claim 1 wherein said coated pattern of dichromic mirror will produce at least one of various reflective color schemes including blue, red, orange, violet, green, pink, yellow, gray, black, brown, white, silver, and gold.

6. The image formed by the coated pattern of dichromic mirror according to claim 1 wherein all elements of said coated pattern of dichromic mirror will reflect the same unique color scheme.

7. The image formed by the coated pattern of dichromic mirror according to claim 1 wherein some elements of said coated pattern of dichromic mirror will reflect the same unique color scheme and other elements of said dichromic mirror pattern will reflect at least one alternate color scheme forming a multi-color image.

8. The image formed by the coated pattern of dichromic mirror according to claim 1 wherein some elements of said coated pattern of dichromic mirror will have variable opacity sensitive to ambient UV light and other elements of said dichromic mirror pattern will have fixed opacity independent of ambient UV light.

9. The photochromic eyewear lens containing a coated pattern of dichromic mirror according to claim 1 wherein a pair of photochromic lens containing a coated pattern of dichromic mirror are cut and fitted into a frame to create fashion eyewear.

10. The image layer having variable opacity viewable to an external viewer according to claim 1 varies from being a partially visible dichromic mirror when the photochromic coating is lightly tinted to a fully opaque reflective dichromic mirror when the photochromic coating is opaque.

11. A patterned dichromic mirror coating on an optical film that has variable opacity comprising:

an optical film with a stock photochromic coating on one surface without modification to the photochromic layers;

said optical film further containing a coated pattern of dichromic mirror layer forming an image on the film's outer surface;

said image viewable only to an external viewer looking at the outer surface;

said image having variable opacity that ranges from transparent to opaque in response to ambient UV light.

12. The photochromic coating according to claim 11 wherein said film has a transition color that is blue, violet, green, gray, pink, red, amber, yellow, orange or brown.

13. The coated pattern of dichromic mirror according to claim 11 wherein said coated pattern of dichromic mirror will produce at least one of various reflective color schemes including blue, red, orange, violet, green, pink, yellow, gray, black, brown, white, silver, and gold.

14. The image formed by the coated pattern of dichromic mirror according to claim 11 wherein all elements of said coated pattern of dichromic mirror will reflect the same unique color scheme.

15. The image formed by the coated pattern of dichromic mirror according to claim 11 wherein some elements of said coated pattern of dichromic mirror will reflect the same unique color scheme and other elements of said dichromic mirror pattern will reflect at least one alternate color scheme forming a multi-color image.

16. The image formed by the coated pattern of dichromic mirror according to claim 11 wherein some elements of said coated pattern of dichromic mirror will have variable opacity sensitive to ambient UV light and other elements of said dichromic mirror pattern will have fixed opacity independent of ambient UV light.

17. The photochromic optical film containing a coated pattern of dichromic mirror according to claim 11 wherein the photochromic optical film containing a coated pattern of dichromic mirror can be laminated to pair of eyewear lenses that are cut and fitted into a frame to create fashion eyewear.

18. The photochromic optical film containing a coated pattern of dichromic mirror according to claim 11 wherein the photochromic optical film containing a coated pattern of dichromic mirror can be laminated or adhered with optical adhesive to an optical surface.

* * * * *